United States Patent
Terada et al.

(10) Patent No.: US 10,920,931 B2
(45) Date of Patent: Feb. 16, 2021

(54) PRESSURE CONTAINER AND CONTAINER BODY

(71) Applicant: Mitsubishi Chemical Corporation, Chiyoda-ku (JP)

(72) Inventors: Kazuyuki Terada, Tokyo (JP); Keigo Yoshida, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/392,670

(22) Filed: Apr. 24, 2019

(65) Prior Publication Data

US 2019/0249827 A1 Aug. 15, 2019

Related U.S. Application Data

(63) Continuation of application No. PCT/JP2017/039291, filed on Oct. 31, 2017.

(30) Foreign Application Priority Data

Oct. 31, 2016 (JP) .............................. JP2016-213774

(51) Int. Cl.
  *F17C 1/00* (2006.01)
  *F17C 1/16* (2006.01)
  (Continued)

(52) U.S. Cl.
  CPC .............. *F17C 1/005* (2013.01); *B29C 49/04* (2013.01); *F16J 12/00* (2013.01); *F17C 1/16* (2013.01);
  (Continued)

(58) Field of Classification Search
  CPC .... F17C 1/005; F17C 1/16; F17C 1/00; F17C 1/04; F17C 1/06; F17C 2201/0109;
  (Continued)

(56) References Cited

U.S. PATENT DOCUMENTS

2014/0263358 A1* 9/2014 Espinosa-Loza ....... F17C 13/06
                                                              220/560.04
2015/0330568 A1* 11/2015 Nettis ...................... F17C 1/02
                                                              220/4.01
(Continued)

FOREIGN PATENT DOCUMENTS

JP          43-21157         9/1968
JP          1-162537 A       6/1989
            (Continued)

OTHER PUBLICATIONS

International Search Report dated Jan. 9, 2018 in PCT/JP2017/039291 (with English Translation), 4 pages.
(Continued)

*Primary Examiner* — Steven A. Reynolds
*Assistant Examiner* — Javier A Pagan
(74) *Attorney, Agent, or Firm* — Oblon, McClelland, Maier & Neustadt, L.L.P.

(57) ABSTRACT

The present invention can ensure a large capacity while curbing enlargement of occupancy space or quality degradation due to unstable winding of a fiber-reinforced resin material. A pressure container (1) is provided with: a container body (2); and a cylindrical straight body part (10) and a hemispherical dome part (12) which are formed of an outer shell (3) made of a fiber-reinforced resin material, wherein, in a cross-section of the dome part (12) taken along the central axis of the straight body part (10), the shape of the outer surface (21) of the dome part (12) of the container body (2) is a curved shape that falls within the range of ellipse A and ellipse B when the outside diameter of the straight body part (10) of the container body (2) is defined as 2a. The ellipse A is an ellipse that satisfies b/a=0.55, where the major axis thereof is defined as a straight line k connecting boundary points p between the straight body part (10) and the outer surface (21) of the dome part (12) of the (Continued)

container body (2), the diameter along the major axis is defined as 2a, and the diameter along the minor axis is defined as 2b. The ellipse B is an ellipse that satisfies b/a=0.70, where the major axis thereof is defined as the straight line k, the diameter along the major axis is defined as 2a, and the diameter along the minor axis is defined as 2b.

6 Claims, 3 Drawing Sheets

(51) Int. Cl.
*F16J 12/00* (2006.01)
*B29C 49/04* (2006.01)
(52) U.S. Cl.
CPC ............... *F17C 2203/0604* (2013.01); *F17C 2203/0619* (2013.01); *F17C 2203/0663* (2013.01); *Y02E 60/32* (2013.01)
(58) Field of Classification Search
CPC ....... F17C 2201/0114; F17C 2201/0128; F16J 12/00; B29C 49/04
See application file for complete search history.

(56) References Cited

U.S. PATENT DOCUMENTS

| | | | | |
|---|---|---|---|---|
| 2015/0362125 | A1* | 12/2015 | Morales | F17C 1/06 |
| | | | | 220/4.12 |
| 2017/0343158 | A1* | 11/2017 | Kato | C08J 5/042 |
| 2020/0072416 | A1* | 3/2020 | Yoshida | B29C 70/32 |

FOREIGN PATENT DOCUMENTS

| | | |
|---|---|---|
| JP | 3-89098 A | 4/1991 |
| JP | 5-71643 A | 3/1993 |
| JP | 10-338038 A | 12/1998 |
| JP | 2016-102546 A | 6/2016 |

OTHER PUBLICATIONS

Office Action dated Oct. 30, 2018 in corresponding Japanese Patent Application No. 2017-562389 (with English Translation), 7 pages.
Decision of Refusal dated Apr. 23, 2019 in corresponding Japanese Patent Application No. 2017-562389 (with English Translation), 8 pages.

* cited by examiner

FIG. 3

PRESSURE CONTAINER AND CONTAINER BODY

TECHNICAL FIELD

The present invention relates to a pressure container and a container body.

The present application claims priority on Japanese Patent Application No. 2016-213774, filed in Japan, on Oct. 31, 2016, the content of which is incorporated herein by reference.

BACKGROUND ART

For example, in terms of lightweight properties and high strength of the pressure container, a pressure container having a resin container body (liner) reinforced by an outer shell made of a fiber-reinforced resin layer is used as a fuel tank, which is mounted on a vehicle such as an automobile, or a tank, which is used to store or transport natural gas or hydrogen gas. A reinforcement fiber used in the outer shell includes glass fiber, carbon fiber, or the like. Above all, the carbon fiber is preferably used for a storage tank of natural gas because the carbon fiber has high specific strength and highly contributes to a reduction in weight of the pressure container.

For example, as a pressure container, there is known a pressure container including a resin container body, which has a cylindrical straight body part and hemispherical dome parts (mirror parts) provided on both ends of the straight body part, and a fiber-reinforced resin layer formed on an outer side of the container body (Patent Document 1). In general, the container body is formed by a direct blow molding method. In addition, an outer shell is formed by a fiber-reinforced resin material obtained by impregnating elongated reinforcement fiber bundles with matrix resin, the fiber-reinforced resin material being wound on an outer side of the container body by a filament winding method (hereinafter, referred to as an FW method) and being cured.

CITATION LIST

Patent Document

Patent Document 1: JP 3-89098 A

SUMMARY OF THE INVENTION

Problem to be Solved by the Invention

A pressure container needs to have as large a capacity as possible, while an enlargement of occupancy space is curbed. In the pressure container, a method of increasing the capacity while curbing the enlargement of occupancy space includes a method of increase a length of a straight body part as long as possible and decreasing a height of a dome part. However, when the height of the dome part is set to be low, a fiber-reinforced resin material slips in the dome part during winding of the fiber-reinforced resin material on an outer side of the container body by an FW method or the like, and thus it is difficult to perform stable winding of the fiber-reinforced resin material. Hence, there occurs quality degradation of the pressure container such as degradation of pressure resistance due to local unevenness of thickness of the outer shell in the dome part.

The invention has an object of providing a pressure container and a container body that can ensure a large capacity while curbing enlargement of occupancy space or quality degradation due to unstable winding of a fiber-reinforced resin material.

Means for Solving Problem

The invention has the following configuration.

[1] A pressure container includes: a cylindrical straight body part; and hemispherical dome parts that are provided on both ends of the straight body part and are narrowed as being away from the straight body part. The straight body part and the dome parts are formed to have a container body and an outer shell that is provided on an outer side of the container body, containing a fiber-reinforced resin material comprising reinforcement fibers and matrix resin.

In a cross-section obtained by cutting the container body along a central axis of the straight body part, a shape of an outer surface of at least one dome part of the container body is a curved shape that is convex toward the outer side and falls within a range between the following ellipse A drawn with a diameter of the container body on an outer side of the straight body part as a diameter along a major axis thereof and the following ellipse B drawn with a diameter of the container body on the outer side of the straight body part as a diameter along a major axis thereof.

The ellipse A is an ellipse that satisfies b/a=0.55, where the major axis thereof is defined as a straight line connecting boundary points between the straight body part and the outer surface of the dome part of the container body, the diameter along the major axis is defined as 2a, and a diameter along a minor axis is defined as 2b.

The ellipse B is an ellipse that satisfies b/a=0.70, where the major axis thereof is defined as a straight line connecting boundary points between the straight body part and the outer surface of the dome part of the container body, the diameter along the major axis is defined as 2a, and a diameter along a minor axis is defined as 2b.

[2] In the pressure container according to [1], an average thickness of the container body in the dome part is 1.2 times to 4 times an average thickness of the container body in the straight body part.

[3] In the pressure container according to [1] or [2], the container body is provided with a projection/recess portion on an inner side thereof, the projection/recess portion being extended into a streak shape from a center of an inner surface of the dome part toward the straight body part.

[4] A container body includes: a cylindrical straight body part; and hemispherical dome parts that are provided on both ends of the straight body part and are narrowed as being away from the straight body part.

In a cross-section cut along a central axis of the straight body part, a shape of an outer surface of at least one dome part of the container body is a curved shape that is convex toward an outer side and falls between the following ellipse A drawn with a diameter of the container body on an outer side of the straight body part as a diameter along a major axis thereof and the following ellipse B drawn with a diameter of the container body on the outer side of the straight body part as a diameter along a major axis thereof.

The ellipse A is an ellipse that satisfies b/a=0.55, where the major axis thereof is defined as a straight line connecting boundary points between the straight body part and the outer surface of the dome part of the container body, the diameter along the major axis is defined as 2a, and a diameter along a minor axis is defined as 2b.

The ellipse B is an ellipse that satisfies b/a=0.70, where the major axis thereof is defined as a straight line connecting boundary points between the straight body part and the outer surface of the dome part of the container body, the diameter along the major axis is defined as 2a, and a diameter along a minor axis is defined as 2b.

[5] In the container body according to [4], an average thickness of the container body in the dome part is 1.2 times to 4 times an average thickness of the container body in the straight body part.

[6] In the container body according to [4] or [5], the container body is provided with a projection/recess portion on an inner side thereof, the projection/recess portion being extended into a streak shape from a center of an inner surface of the dome part toward the straight body part.

Effect of the Invention

A pressure container and a container body of the invention can ensure a large capacity while curbing enlargement of occupancy space or quality degradation due to unstable winding of a fiber-reinforced resin material.

MODES FOR CARRYING OUT THE INVENTION

A pressure container of the invention includes a cylindrical straight body part and hemispherical dome parts that are provided on both ends of the straight body part and are narrowed as being away from the straight body part. The straight body part and the dome part are formed to have a container body and an outer shell that is provided on an outer side of the container body, containing a fiber-reinforced resin material comprising reinforcement fibers and matrix resin. In other words, in the pressure container of the invention, the container body is reinforced by the outer shell formed of the fiber-reinforced resin material.

Hereinafter, an example of the pressure container of the invention will be described. Incidentally, in the drawings referred to in the following description, a characteristic portion is illustrated by being enlarged for convenience, in order for a characteristic to be easily understood in some cases, and thus a dimension ratio or the like of each configurational element is not necessarily equal to an actual dimension ratio or the like. In addition, a material, a dimension, or the like described below is provided as an example. Hence, the invention is not necessarily limited thereto, and it is possible to perform appropriate modifications in a range without modifying the gist thereof.

Figure 1:
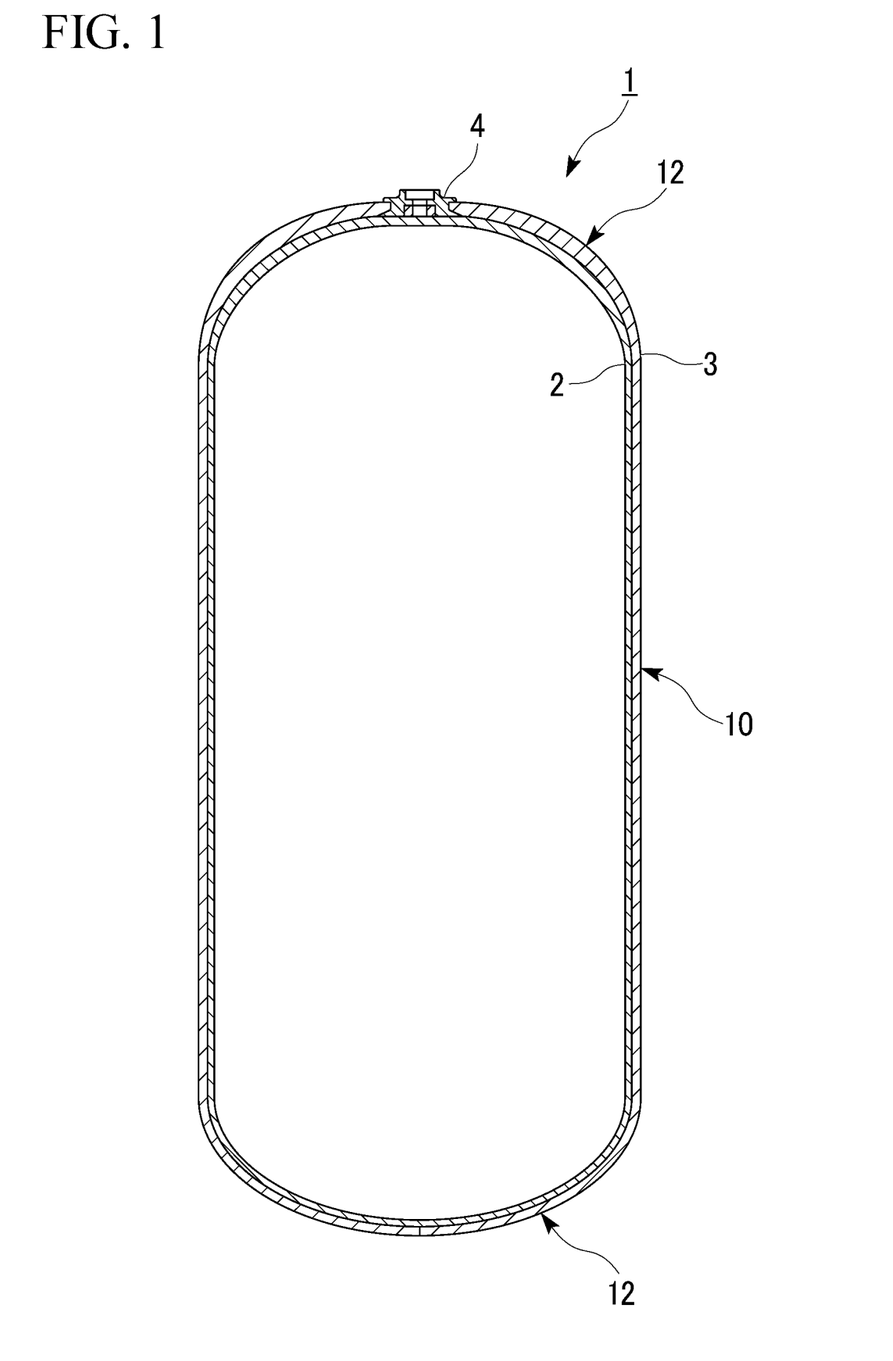
FIG. 1 is a view illustrating an example of a pressure container of the invention, that is, a cross-sectional view of the pressure container cut along an axial direction of a straight body part.
Figure 2:
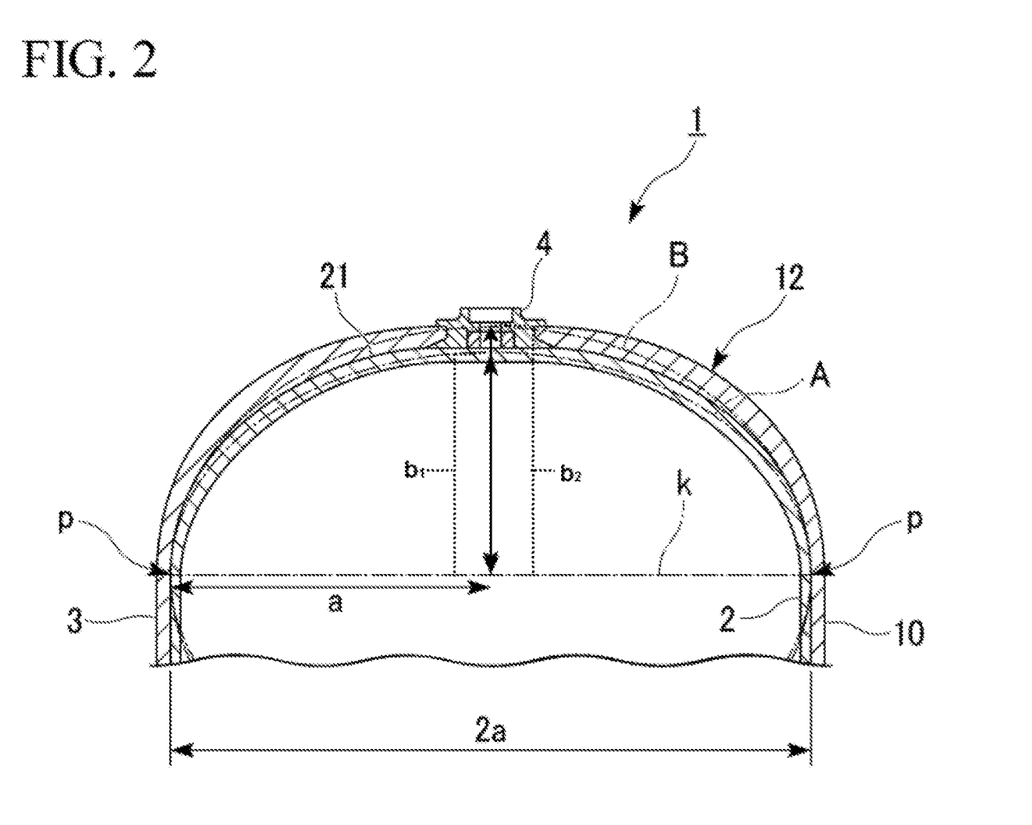
FIG. 2 is an enlarged cross-sectional view of a dome part of the pressure container in FIG. 1.

As illustrated in FIGS. 1 and 2, a pressure container 1 of the embodiment includes a cylindrical straight body part 10 and hemispherical dome parts 12 that are provided on both ends of the straight body part 10 and are narrowed as being away from the straight body part 10. The straight body part 10 and the dome parts 12 are formed to have a resin container body (liner) 2 and an outer shell 3 that is provided on an outer side of the container body 2, containing a fiber-reinforced resin material comprising reinforcement fibers and matrix resin. In addition, the pressure container 1 is provided with a metal end boss 4 on a distal portion of one dome part 12. The end boss 4 is closely fixed to the distal portion of the dome part 12 so as to be sandwiched by the container body 2 and the outer shell 3.

In order to manufacture the pressure container and the container body, the container body 2 is preferably a resin container made of a direct blow molding product, from the viewpoint of ease of manufacturing or manufacturing costs. For example, a portion of a dome part and a portion of a straight body part, which are manufactured separately from each other, are joined to each other so as to form a container body in some cases. However, in the container body, central axes of the dome part and the straight body part are displaced from each other, or the central axes of a pair of dome parts are displaced from each other, and thereby eccentricity is likely to occur. When the eccentricity occurs in the container body, winding displacement is likely to occur during winding of the fiber-reinforced resin material by an FW method or the like, and thus quality is likely to be degraded. By contrast, when the container body 2 is the resin container made of the direct blow molding product, that is, a container having a dome part and a straight body part which are integrally formed, an occurrence of the eccentricity is curbed, and thus a high-quality pressure container is obtained.

In a case where the container body 2 is the direct blow molding product, the container body is provided with a projection/recess portion on an inner side thereof, the projection/recess portion being extended into a streak shape from a center of an inner surface of the dome part toward the straight body part. The center of the inner surface of the dome part means a position corresponding to the distal portion of the dome part on the inner surface of the dome part. The projection/recess portion is formed when a parison for forming the container body is pinched between a pair of dies during direct blow molding and is a so-called pinch-off portion. In the pinch-off portion, a recess line (pinch line) is formed between two projection lines.

In addition, regardless of an internal capacity, the direct blow molding makes it possible to mold a container and is particularly effective to mold a large-sized container of 450 liter to 1,500 liter and, more preferably, 700 liter to 1,300 liter.

In the pressure container 1, as illustrated in FIG. 2, in a cross-section obtained by cutting the container body 2 along a central axis of the straight body part 10, a shape of an outer surface 21 of the dome part 12 of the container body 2 is a curved shape that is convex toward the outer side and falls within a range between the following virtual ellipse A drawn with a diameter of the container body 2 on an outer side of the straight body part 10 as a diameter along a major axis thereof and, similarly, the following ellipse B drawn with a diameter of the container body 2 on the outer side of the straight body part 10 as a diameter along a major axis thereof.

The ellipse A is an ellipse that satisfies b/a=0.55, where the major axis thereof is defined as a straight line k connecting boundary points p between the straight body part 10 and the outer surface 21 of the dome part 12 of the container body 2, the diameter along the major axis is defined as 2a, and a diameter along a minor axis is defined as 2b.

The ellipse B is an ellipse that satisfies b/a=0.70, where the major axis thereof is defined as the straight line k connecting the boundary points p between the straight body part 10 and the outer surface 21 of the dome part 12 of the container body 2, the diameter along the major axis is defined as 2a, and a diameter along a minor axis is defined as 2b.

The boundary point p is a point of a boundary between a curve that forms the dome part 12 and a straight line that forms the straight body part 10 in the cross-section obtained by cutting the container body 2 along the central axis of the straight body part 10.

In the pressure container 1, while a length of the pressure container 1 in an axial direction is maintained, a height of the dome part 12 is decreased, and the straight body part 10 is increased by an equivalent length of a decrease in height. In this manner, it is possible to increase the capacity without enlargement of occupancy space of the pressure container 1. In this case, when the shape of the outer surface 21 of the dome part 12 of the container body 2 is the curved shape that falls in the range between the ellipse A and the ellipse B in the cross-section, the fiber-reinforced resin material is difficult to slip in the dome part 12 during winding of the fiber-reinforced resin material by the FW method or the like, and thus it is possible to perform stable winding of the fiber-reinforced resin material, even though the height of the dome part 12 is decreased. Hence, in the pressure container 1, it is possible to ensure a large capacity while curbing enlargement of occupancy space or quality degradation due to unstable winding of the fiber-reinforced resin material.

When the shape of the outer surface 21 of the dome part 12 of the container body 2 is smaller than the ellipse A in which b/a is 0.55, that is, is an elliptical shape in which b/a is less than 0.55, it is difficult to perform the winding of the fiber-reinforced resin material. When the shape of the outer surface 21 of the dome part 12 of the container body 2 is larger than the ellipse B in which b/a is 0.70, that is, is an elliptical shape in which b/a exceeds 0.7, it is difficult to ensure a sufficient capacity.

Incidentally, as long as the shape of the outer surface 21 of the dome part 12 of the container body 2 in the cross-section is the curved shape that falls within the range between the ellipse A and the ellipse B, it may not be necessary for the shape to be identical with a curved shape of an ellipse.

In the invention, preferably, in both of the pair of dome parts, the shape of the outer surface of the dome part of the container body is the curved shape that falls within the range between the ellipse A and the ellipse B. Incidentally, in the invention, in only one dome part of the pair of dome parts, the shape of the outer surface of the dome part of the container body may be the curved shape that falls within the range between the ellipse A and the ellipse B.

The distal portion of the dome part 12 of the container body 2 is provided with an opening portion through which gas enters and exits, and an end boss 4 is installed in the portion. During the winding of the fiber-reinforced resin material by the FW method or the like, usually, distal end portions of the pair of dome parts both come into a supported state by a method of attaching or the like of a jig to the end boss 4. Particularly in a case of a heavy pressure container having a large capacity that exceeds 700 L, the container body is likely to be deformed due to its own weight during the winding of the fiber-reinforced resin material, and thus a problem such as winding displacement of the fiber-reinforced resin material occurs in some cases. Hence, in order to curb deformation of the container body due to its own weight during the winding or the like of the fiber-reinforced resin material, it is preferable that, in the container body 2, the dome part 12 be thicker than the straight body part 10.

Specifically, an average thickness of the container body 2 in the dome part 12 is, preferably, 1.2 times to 4 times an average thickness of the container body 2 in the straight body part 10 and, more preferably, 1.3 times to 3 times. When a ratio of the average thicknesses is within the range described above, the container body is unlikely to be deformed due to its own weight even though the container body is supported at the distal end portions of the pair of dome parts during the winding of the fiber-reinforced resin material.

Incidentally, the average thickness of the container body in the dome part means a value obtained by measuring thicknesses of the container body at random eight positions in the dome part and averaging the thicknesses. In a case where the container body is the direct blow molding product, the average thickness means a value obtained by measuring thicknesses at four positions in each of a portion along a pinch line (PL) and a portion in a 90° direction around an axis from the pinch line and averaging the thicknesses. The average thickness of the container body in the straight body part means a value obtained by measuring thicknesses of the container body at random eight positions in the straight body part and averaging the thicknesses.

The average thickness of the container body 2 in the dome part 12 is, preferably, 3 to 30 mm and, more preferably, 4 to 20 mm.

The average thickness of the container body 2 in the straight body part 10 is, preferably, 2 to 20 mm and, more preferably, 3 to 8 mm.

A material having a gas barrier property, which does not allow leakage of high-pressure gas with which the pressure container is filled, is used as a material of the container body (liner), and it is possible to appropriately use a known material for the pressure container. Examples of the material include polyolefin resin such as high-density polyethylene-based resin, cross-linked polyethylene, polypropylene resin, or cyclic olefin-based resin; polyamide-based resin such as nylon 6, nylon 6,6, nylon 11, or nylon 12; polyester-based resin such as polyethylene terephthalate or polybutylene terephthalate; engineering plastic such as acrylonitrile-butadiene-styrene copolymer (ABS) resin, polyacetal resin, polycarbonate resin, polyphenylene ether resin, polyphenylene sulfide resin, polysulfone resin, or polyimide resin; or the like.

As a resin of which the container body is formed, one resin may be individually used, or a combination of two or more resins may be used.

Incidentally, the container body may be made of metal such as iron or an aluminum alloy.

An example of the fiber-reinforced composite material, of which the outer shell is formed, includes a fiber-reinforced composite material comprising matrix resin and a reinforcement fiber base material in which reinforcement fibers are arranged.

Examples of the reinforcement fiber include carbon fiber, glass fiber, high-modulus organic fiber (aramid fiber, ultra-high strength polyester fiber, or the like), metal fiber, ceramic fiber, or the like. The carbon fiber includes a pitch-based carbon fiber, polyacrylonitrile (PAN-based) carbon fiber, rayon-based carbon fiber, or the like. Above all, it is preferable to use the pitch-based carbon fiber, in that it is easy to obtain particularly high elastic modulus, and it is preferable to use the PAN-based carbon fiber, in that it is easy to obtain high strength. As the reinforcement fiber, one type of fiber may be individually used, or a combination of two or more types of fibers may be used.

As the matrix resin, thermosetting resin or photocurable resin may be used, or thermoplastic resin may be used. Examples of the thermosetting resin or the photocurable resin include epoxy resin, unsaturated polyester resin, urea resin, phenol resin, melamine resin, polyurethane resin, polyimide resin, vinyl ester resin, or the like. Examples of the thermoplastic resin include polyamide resin, polyester resin such as polyethylene terephthalate or polybutylene terephthalate, engineering plastic such as ABS resin, polyether ketone, or polyphenylene sulfide, polyolefin resin such as polypropylene or poly 4-methyl-1-pentene, or the like. As the matrix resin, one resin may be individually used, or a combination of two or more resins may be used.

The end boss can be formed to have a known shape that is used in the pressure container. The end boss 4 in the pressure container 1 has a substantially cylindrical shape having a through-hole. A shape of an inner surface of the end boss is designed in accordance with a shape of a valve or the like which is attached to an inside of the end boss. For example, it is possible to form internal threads on an inner peripheral surface close to an upper end in the through-hole of the end boss and to attach a valve or the like for gas supply or removal by screwing.

Metal that configures the end boss is not particularly limited, and it is possible to use known metal. Examples thereof include an aluminum alloy, stainless steel (SUS), carbon steel, alloy steel, brass, or the like.

(Method for Manufacturing Pressure Container)

It is possible to use a known method as a method for manufacturing the pressure container and the container body of the invention, and the direct blow molding method is preferably employed in a case of the resin container body. A shape of the pair of dies that pinches a parison is adjusted in the direct blow molding method, and thereby it is possible to adjust the shape of the outer surface 21 of the dome part 12 of the container body 2 in the cross-section.

For example, a method of forming the outer shell includes a method of winding an elongated fiber-reinforced resin material entirely on the outer side of the container body, and then curing the fiber-reinforced resin material. It is possible to employ the FW method, a tape winding method, or the like as the method of winding the fiber-reinforced resin material, and it is preferable to form the outer shell by using the FW method. A winding method in the FW method, the tape winding method, or the like is not particularly limited and includes helical winding, hoop winding, label winding, or the like and a combination thereof.

When the outer shell is formed, it is preferable to wind the fiber-reinforced resin material on the outer side of the container body in a state where the inside of the container body is pressurized. Consequently, even in a case where the container body is thin in thickness, in order to obtain a pressure container having a particularly large capacity that exceeds 700 L, for example, it is possible to curb deformation of the container body due to a compressive force generated by tightening of the fiber-reinforced resin material during the winding thereof.

In a case where the inside of the container body is pressurized when the fiber-reinforced resin material is wound, it is preferable that the inside of the container body be pressurized, and then the fiber-reinforced resin material start to be wound, and a pressure in the container body is further increased from a stage in which the outer side of the container body is uniformly covered with the fiber-reinforced resin material during the winding. When the outer side of the container body is uniformly covered with the fiber-reinforced resin material, resistance to internal pressure of the container body increases due to the fiber-reinforced resin material that uniformly covers the container body. Hence, in the stage in which the outer side of the container body is uniformly covered with the fiber-reinforced resin material, the pressure in the container body is further increased, and subsequent winding thereof proceeds. In this manner, it is easier to curb the deformation of the container body due to the compressive force of the fiber-reinforced resin material.

In a case where the outer side of the container body is uniformly covered with the fiber-reinforced resin material, and then the pressure of the container body is increased, the pressure in the container body may be changed in stages or may be smoothly changed so as to be gradually increased.

During the winding of the fiber-reinforced resin material, the pressure in the container body from the start of the winding to an end of uniform covering of the fiber-reinforced resin material on the outer surface of the container body is, preferably, 0.01 to 0.15 MPa and, more preferably, 0.05 to 0.10 MPa.

During the winding of the fiber-reinforced resin material, the pressure in the container body from the end of uniform covering of the fiber-reinforced resin material on the outer surface of the container body to the end of the winding is, preferably, 0.01 to 0.30 MPa and, more preferably, 0.05 to 0.20 MPa. The pressure in the container body is increased in stages, depending on a winding thickness of the fiber-reinforced resin material.

In a case where the inside of the container body is pressurized during the winding of the fiber-reinforced resin material, it is preferable to perform a curing reaction of the fiber-reinforced resin material in a state where the container body is pressurized, in terms of easy manufacturing.

As described above, in the pressure container of the invention, in the cross-section obtained by cutting the dome part along the central axis of the straight body part, the shape of the outer surface of the dome part of the container body is the curved shape that falls within the range between the ellipse A and the ellipse B. While the length of the pressure container 1 in the axial direction is maintained, the height of the dome part 12 is decreased such that the shape of the outer surface of the dome part of the container body is the curved shape, and the straight body part 10 is increased by an equivalent length of the decrease in height. In this manner, it is possible to ensure the large capacity while curbing the enlargement of occupancy space or quality degradation.

Incidentally, the pressure container of the invention is not limited to the pressure container 1 described above. For example, the pressure container of the invention may be a pressure container provided with end bosses in both dome parts.

Hereinafter, the invention will be specifically described with Examples; however, the invention is not limited to the following description.

Example 1

Figure 3:
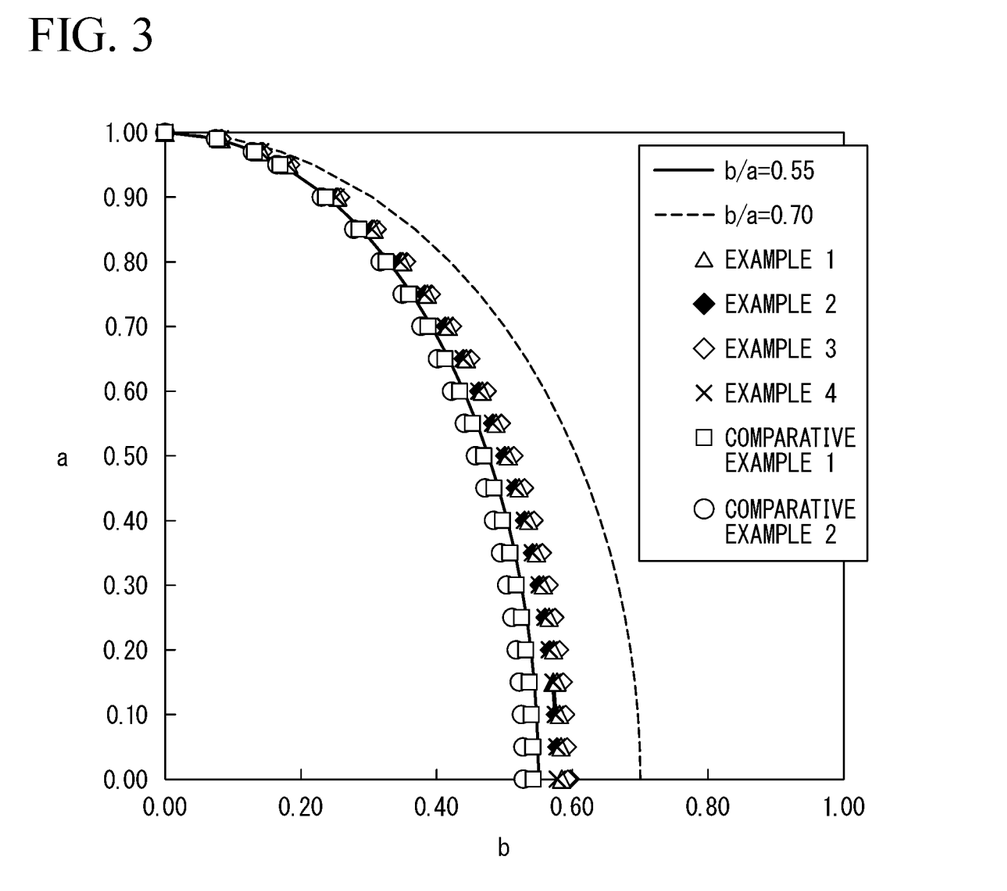
FIG. 3 is a view illustrating a shape of an outer surface of a dome part in a container body of Examples 1 to 4 and Compressive Examples 1 and 2.

The container body having a capacity of 710 L was molded by the direct blow molding method such that, in the cross-section obtained by cutting the dome part along the central axis of the straight body part, the shape of the outer surface from a side of the straight body part to the distal portion in the dome part of the container body was the curved shape illustrated in FIG. 3. Incidentally, in FIG. 3, values of a and b were standardized such that the value of a was "1", and the values were plotted for convenience, in order to easily identify curved shapes of examples. As a material of the direct blow molding, polyethylene ("LUPOLEN 4261AG UV 600005" (product name) manufactured by LyondellBasell Industries) as a material for molding the container body was used. Values of a diameter along the major axis, a diameter along the minor axis, and b/a in the obtained container body are shown in Table 5.

In the obtained container body, thicknesses of a first dome part, a straight body part, and a second dome part were each measured at four positions at equal intervals in the axial direction. The thicknesses were measured in each of the portion along the pinch line (PL) and the portion in the 90° direction around the axis from the pinch line. In the measurement of the thicknesses, 38DL PLUS ultrasonic thickness gage manufactured by Olympus Corporation was used. Measurement results of the thicknesses are shown in Table 1. An average thickness of the first dome part and the second dome part was 1.83 times an average thickness of the straight body part.

TABLE 1

|  |  | Thickness of container body [mm] | |
|---|---|---|---|
|  |  | PL | 90° direction |
| First dome part | 1 | 10.9 | 9.8 |
|  | 2 | 11.5 | 8.3 |
|  | 3 | 11.7 | 8.7 |
|  | 4 | 11.0 | 6.8 |
|  | Average | 11.3 | 8.4 |
| Straight body part | 1 | 7.0 | 5.2 |
|  | 2 | 5.4 | 5.3 |
|  | 3 | 5.6 | 5.3 |
|  | 4 | 5.8 | 5.5 |
|  | Average | 5.9 | 5.3 |
| Second dome part | 1 | 10.5 | 13.9 |
|  | 2 | 9.6 | 10.9 |
|  | 3 | 11.9 | 8.7 |
|  | 4 | 14.5 | 6.5 |
|  | Average | 11.6 | 10.0 |

In addition, an elongated fiber-reinforced resin material comprising carbon fiber (product name "Grafil 37-800WD" (product name) manufactured by Mitsubishi Rayon Carbon Fiber and Composites, Inc) and epoxy resins ("Araldite LY 564/1564", "Aradur 917", and "Accelerator 960-1" (product name) manufactured by Huntsman Corporation) was wound on the outer side of the obtained container body by the FW method, and the fiber-reinforced resin material was cured such that a pressure container was obtained. When the fiber-reinforced resin material was wound, stable winding was performed without any problem such as winding displacement of the fiber-reinforced resin material or deformation of the container body.

Example 2

A main container body was molded by the direct blow molding method, similarly to Example 1 except that polyethylene ("HB111R" (product name) manufactured by Japan Polyethylene Corporation) was used as the material for molding the container body, the shape of the outer surface from a side of the straight body part to the distal portion in the dome part of the container body was modified to be the curved shape illustrated in FIG. 3, and the capacity was 9 L. Values of a diameter along the major axis, a diameter along the minor axis, and b/a in the obtained container body are shown in Table 5.

In the obtained container body, similarly to Example 1, thicknesses were measured at four positions at equal intervals in the axial direction in each of a portion along the PL and a portion in the 90° direction around the axis from the PL in the first dome part, the straight body part, and the second dome part. Measurement results of the thicknesses are shown in Table 2. An average thickness of the first dome part and the second dome part was 1.57 times an average thickness of the straight body part.

In addition, similarly to Example 1, an elongated fiber-reinforced resin material was wound on the outer side of the obtained container body by the FW method, and the fiber-reinforced resin material was cured such that a pressure container was obtained. When the fiber-reinforced resin material was wound, stable winding was performed without any problem such as winding displacement of the fiber-reinforced resin material or deformation of the container body.

TABLE 2

|  |  | Thickness of container body [mm] | |
|---|---|---|---|
|  |  | PL | 90° direction |
| First dome part | 1 | 9.8 | 5.0 |
|  | 2 | 9.7 | 5.0 |
|  | 3 | 9.8 | 5.0 |
|  | 4 | 10.7 | 4.8 |
|  | Average | 10.0 | 4.9 |
| Straight body part | 1 | 7.0 | 5.4 |
|  | 2 | 5.4 | 4.5 |
|  | 3 | 4.8 | 4.4 |
|  | 4 | 4.9 | 4.0 |
|  | Average | 5.5 | 4.6 |
| Second dome part | 1 | 10.3 | 4.8 |
|  | 2 | 11.0 | 5.5 |
|  | 3 | 12.1 | 5.5 |
|  | 4 | 12.0 | 5.5 |
|  | Average | 11.3 | 5.3 |

Example 3

A main container body was molded by the direct blow molding method, similarly to Example 1 except that the shape of the outer surface from a side of the straight body part to the distal portion in the dome part of the container body was modified to be the curved shape illustrated in FIG. 3, and the capacity was 1,000 L. Values of a diameter along the major axis, a diameter along the minor axis, and b/a in the obtained container body are shown in Table 5.

In the obtained container body, similarly to Example 1, thicknesses were measured at four positions at equal intervals in the axial direction in each of a portion along the PL and a portion in the 90° direction around the axis from the PL in the first dome part, the straight body part, and the second dome part. Measurement results of the thicknesses are shown in Table 3. An average thickness of the first dome part and the second dome part was 1.36 times an average thickness of the straight body part.

In addition, similarly to Example 1, an elongated fiber-reinforced resin material was wound on the outer side of the obtained container body by the FW method, and the fiber-reinforced resin material was cured such that a pressure container was obtained. When the fiber-reinforced resin material was wound, stable winding was performed without any problem such as winding displacement of the fiber-reinforced resin material or deformation of the container body.

TABLE 3

| | | Thickness of container body [mm] | |
|---|---|---|---|
| | | PL | 90° direction |
| First dome part | 1 | 14.6 | 10.3 |
| | 2 | 14.6 | 10.3 |
| | 3 | 15.8 | 9.2 |
| | 4 | 17.5 | 8.3 |
| | Average | 15.6 | 9.5 |
| Straight body part | 1 | 7.8 | 6.6 |
| | 2 | 8.6 | 8.8 |
| | 3 | 9.6 | 10.0 |
| | 4 | 11.6 | 9.0 |
| | Average | 9.4 | 8.6 |
| Second dome part | 1 | 13.4 | 7.5 |
| | 2 | 15.2 | 8.7 |
| | 3 | 15.7 | 9.3 |
| | 4 | 15.0 | 10.1 |
| | Average | 14.8 | 8.9 |

TABLE 4

| | | Thickness of container body [mm] | |
|---|---|---|---|
| | | PL | 90° direction |
| First dome part | 1 | 11.7 | 7.7 |
| | 2 | 12.6 | 6.7 |
| | 3 | 13.5 | 6.0 |
| | 4 | 14.3 | 5.9 |
| | Average | 13.0 | 6.6 |
| Straight body part | 1 | 7.8 | 5.9 |
| | 2 | 6.3 | 5.7 |
| | 3 | 7.0 | 5.8 |
| | 4 | 6.5 | 5.7 |
| | Average | 6.9 | 5.7 |
| Second dome part | 1 | 14.2 | 6.7 |
| | 2 | 14.6 | 7.1 |
| | 3 | 15.8 | 7.9 |
| | 4 | 16.3 | 9.6 |
| | Average | 15.2 | 7.8 |

Example 4

A main container body was molded by the direct blow molding method, similarly to Example 1 except that the shape of the outer surface from a side of the straight body part to the distal portion in the dome part of the container body was modified to be the curved shape illustrated in FIG. 3, and the capacity was 80 L. Values of a diameter along the major axis, a diameter along the minor axis, and b/a in the obtained container body are shown in Table 5.

In the obtained container body, similarly to Example 1, thicknesses were measured at four positions at equal intervals in the axial direction in each of a portion along the PL and a portion in the 90° direction around the axis from the PL in the first dome part, the straight body part, and the second dome part. Measurement results of the thicknesses are shown in Table 4. An average thickness of the first dome part and the second dome part was 1.69 times an average thickness of the straight body part.

In addition, similarly to Example 1, an elongated fiber-reinforced resin material was wound on the outer side of the obtained container body by the FW method, and the fiber-reinforced resin material was cured such that a pressure container was obtained. When the fiber-reinforced resin material was wound, stable winding was performed without any problem such as winding displacement of the fiber-reinforced resin material or deformation of the container body.

Comparative Example 1

A container body was molded similarly to Example 1 except that the shape of the outer surface from a side of the straight body part to the distal portion in the dome part of the container body was modified to be the curved shape illustrated in FIG. 3. Values of a diameter along the major axis, a diameter along the minor axis, and b/a in the obtained container body are shown in Table 5. When an elongated fiber-reinforced resin material was wound on the outer side of the obtained container body, similarly to Example 1, the fiber-reinforced resin material slipped in the dome part, and winding displacement occurred. Hence, stable winding of the fiber-reinforced resin material was not performed.

Comparative Example 2

A container body was molded similarly to Example 1 except that the shape of the outer surface from a side of the straight body part to the distal portion in the dome part of the container body was modified to be the curved shape illustrated in FIG. 3. Values of a diameter along the major axis, a diameter along the minor axis, and b/a in the obtained container body are shown in Table 5. When an elongated fiber-reinforced resin material was wound on the outer side of the obtained container body, similarly to Example 1, the fiber-reinforced resin material slipped in the dome part, and winding displacement occurred. Hence, stable winding of the fiber-reinforced resin material was not performed.

TABLE 5

| | Example 1 | Example 2 | Example 3 | Example 4 | Comparative Example 1 | Comparative Example 2 |
|---|---|---|---|---|---|---|
| Capacity [L] | 710 | 9 | 1000 | 80 | 700 | 9 |
| Diameter along major axis (2a) [mm] | 719.0 | 160.0 | 789.0 | 384.0 | 719.0 | 161.0 |
| Diameter along minor axis (2b) [mm] | 210.0 | 47.8 | 234.0 | 111.0 | 195.0 | 42.5 |
| b/a | 0.58 | 0.60 | 0.59 | 0.58 | 0.54 | 0.53 |

EXPLANATIONS OF LETTERS OR NUMERALS

1 PRESSURE CONTAINER
2 CONTAINER BODY
21 OUTER SURFACE OF DOME PART OF CONTAINER BODY
3 OUTER SHELL
10 STRAIGHT BODY PART
12 DOME PART

The invention claimed is:

1. A pressure container comprising:
a cylindrical straight body part; and
hemispherical dome parts that are provided on both ends of the straight body part and narrowed in a direction away from the straight body part,
wherein the straight body part and the dome parts form a container body; and
an outer shell that is provided on an outer side of the container body, wherein the outer shell contains a fiber-reinforced resin material comprising reinforcement fibers and matrix resin, and
wherein, in a cross-section of the container body along a central axis of the straight body part, a shape of an outer surface of at least one dome part of the container body is a curved shape that is convex toward the outer side and falls within a range between a first ellipse (A) drawn with a diameter of the container body on an outer side of the straight body part as a diameter along a major axis thereof and a second ellipse (B) drawn with a diameter of the container body on the outer side of the straight body part as a diameter along a major axis thereof,
the first ellipse (A) being an ellipse that satisfies $b_1/a=0.55$, wherein (a) is a semi-major axis of the first ellipse (A) and ($b_1$) is a semi-minor axis of the first ellipse (A), where the major axis thereof is defined as a straight line (k) connecting boundary points (p), wherein the boundary points (p) are at opposing locations between the straight body part and the outer surface of the dome part of the container body, the diameter along the major axis is defined as 2a, and a diameter along a minor axis is defined as $2b_1$, and
the second ellipse (B) being an ellipse that satisfies $b_2/a=0.70$, wherein (a) is a semi-major axis of the second ellipse (B) and ($b_2$) is a semi-minor axis of the second ellipse (B), where the major axis thereof is defined as a straight line (k) connecting boundary points (p), wherein the boundary points (p) are at opposing locations between the straight body part and the outer surface of the dome part of the container body, the diameter along the major axis is defined as 2a, and a diameter along a minor axis is defined as $2b_2$.

2. The pressure container according to claim 1,
wherein an average thickness of the container body in the dome part is 1.2 times to 4 times an average thickness of the container body in the straight body part.

3. The pressure container according to claim 1 or 2,
wherein the container body is provided with a projection/recess portion on an inner side thereof, the projection/recess portion being extended into a streak shape from a center of an inner surface of the dome part toward the straight body part.

4. A container body comprising:
a cylindrical straight body part; and
hemispherical dome parts that are provided on both ends of the straight body part and narrowed in a direction away from the straight body part,
wherein, in a cross-section along a central axis of the straight body part, a shape of an outer surface of at least one dome part of the container body is a curved shape that is convex toward an outer side and falls within a range between a first ellipse (A) drawn with a diameter of the container body on an outer side of the straight body part as a diameter along a major axis thereof and a second ellipse (B) drawn with a diameter of the container body on the outer side of the straight body part as a diameter along a major axis thereof,
the first ellipse (A) being an ellipse that satisfies $b_1/a=0.55$, wherein (a) is a semi-major axis of the first ellipse (A) and ($b_1$) is a semi-minor axis of the first ellipse (A), where the major axis thereof is defined as a straight line (k) connecting boundary points (p), wherein the boundary points (p) are at opposing locations between the straight body part and the outer surface of the dome part of the container body, the diameter along the major axis is defined as 2a, and a diameter along a minor axis is defined as $2b_1$, and
the second ellipse (B) being an ellipse that satisfies $b_2/a=0.70$, wherein (a) is a semi-major axis of the second ellipse (B) and ($b_2$) is a semi-minor axis of the second ellipse (B), where the major axis thereof is defined as a straight line (k) connecting boundary points (p), wherein the boundary points (p) are at opposing locations between the straight body part and the outer surface of the dome part of the container body, the diameter along the major axis is defined as 2a, and a diameter along a minor axis is defined as $2b_2$.

5. The container body according to claim 4,
wherein an average thickness of the container body in the dome part is 1.2 times to 4 times an average thickness of the container body in the straight body part.

6. The container body according to claim 4 or 5,
wherein the container body is provided with a projection/recess portion on an inner side thereof, the projection/recess portion being extended into a streak shape from a center of an inner surface of the dome part toward the straight body part.

* * * * *